United States Patent [19]
Holik et al.

[11] 3,865,719
[45] Feb. 11, 1975

[54] FLOTATION DEVICE FOR A FIBROUS SUSPENSION

[75] Inventors: Herbert Holik, Ravensburg; Karl Mueller, Ringgenweiler, both of Germany

[73] Assignee: Escher Wyss G.m.b.H., Ravensburg, Germany

[22] Filed: Dec. 4, 1972

[21] Appl. No.: 311,484

[30] Foreign Application Priority Data
Dec. 9, 1971 Germany.............................. 2161015

[52] U.S. Cl.................... 209/170, 162/55, 210/221, 261/114 R, 261/122
[58] Field of Search.................. B03d/1/24; 203/20; 202/264; 209/170, 168, 164; 210/44, 220, 221; 261/114 R, 122; 162/4, 55

[56] References Cited
UNITED STATES PATENTS

| | | | |
|---|---|---|---|
| 1,442,306 | 1/1923 | Stonebraker..................... | 209/168 X |
| 2,005,742 | 6/1935 | Hines................................ | 210/44 X |
| 2,124,284 | 7/1938 | Boie.................................. | 209/168 X |
| 3,032,199 | 5/1962 | Sumiya.............................. | 209/170 |
| 3,121,680 | 2/1964 | Ciabattari........................ | 210/221 X |
| 3,147,221 | 9/1964 | Johnston.......................... | 209/168 X |

FOREIGN PATENTS OR APPLICATIONS

| | | | |
|---|---|---|---|
| 53,174 | 12/1922 | Sweden.............................. | 209/170 |
| 926,172 | 5/1963 | Great Britain...................... | 209/168 |

*Primary Examiner*—Frank W. Lutter
*Assistant Examiner*—Ralph J. Hill
*Attorney, Agent, or Firm*—Robert A. Ostmann

[57] ABSTRACT

A flotation device for the purification of a suspension of fibrous material by flotation suitable for the paper industry, more especially for the deinking of a paper stock suspension is disclosed. In a container which has inlet and outlet apertures and inlet and outlet conduits for the suspension, there is an apparatus for the gas treatment of the suspension in the container and also a device for discharging a foam produced by the gas treatment at the surface of the suspension. For the gas treatment a gas distributor is arranged in the lower portion of the container and has a stationary wall provided with gas throughflow apertures and forming a boundary wall for the suspension. The gas throughflow apertures — as viewed in plan view — being arranged at least over a portion of the base area of the container.

13 Claims, 2 Drawing Figures

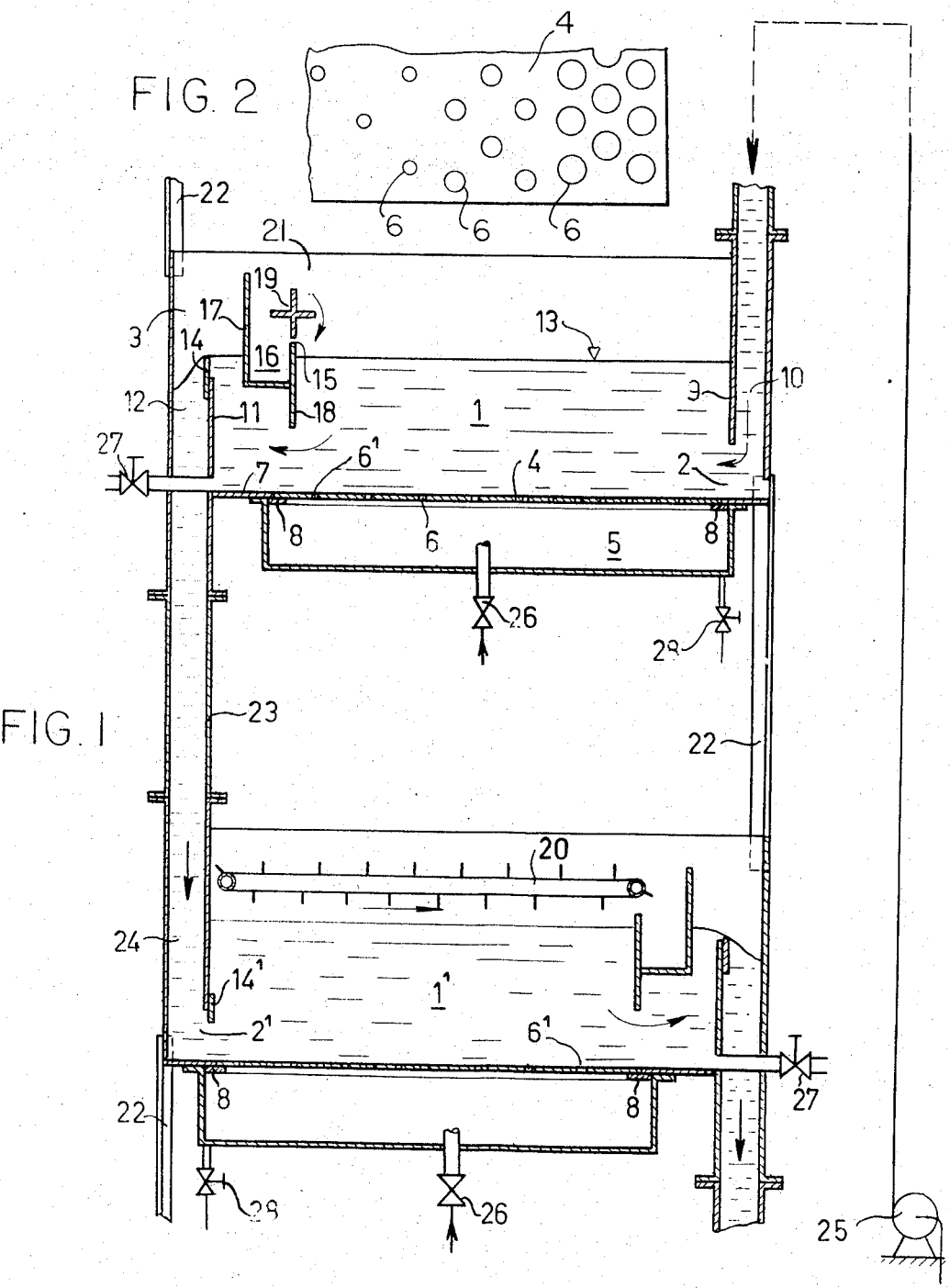

FLOTATION DEVICE FOR A FIBROUS SUSPENSION

BACKGROUND OF THE INVENTION

The invention relates to a flotation device for the purification of a suspension of fibrous material by flotation more especially in the paper industry, for deinking a paper stock suspension. A container for the suspension has inlet and outlet apertures and inlet and outlet conduits for the suspension, an apparatus for the gas treatment of the suspension in the container and a device for discharging a foam produced by the gas treatment at the surface of the suspension.

In flotation, the different wettability of different-substance constituents is used for the sorting of small particles. In the known devices, a stock mixture is suspended in liquid, usually water, mixed with chemicals — so-called wetting agents and/or foaming agents — and conducted into a flotation device and there agitated mechanically and subjected to gas treatment, usually with air. As a result of the introduction of gas the more difficultly wettable substance accumulates at the free surface of the suspension in the foam. The foam is removed from the flotation device.

Thus in the papermaking industry, flotation is used for deinking, that is to say for removing particles such as for example printing inks or other inks from a paper stock suspension prepared with the use of waste paper.

In known devices of the type described initially, the agitation and gassing treatment are carried out by means of apparatus which act at the same time as radial pump, agitator and gas treatment apparatus. Ejectors are also used, usually with a downstream air chest.

But when using all these aforesaid devices or arrangements, considerable turbulences and flow systems are produced in the containers which are difficult to control and carry some of the foam already separated-out above the surface back into the suspension. The hitherto known constructions require complicated inserts in order to prevent this. The rotating parts are also liable to develop faults and are constructionally complicated.

SUMMARY OF THE INVENTION

The invention has as its object to provide a simple flotation device which is particularly suited to the paper industry — and to avoid the known agitating and gas treatment apparatus which cause the aforesaid disadvantages — and also to make such a flotation device capable of being stacked in a simple and space-saving manner to form a tower.

According to the invention this object is — in the case of the initially described device — achieved in that for the gas treatment there is arranged in the lower portion of the container a gas distributor which is stationary, is provided with gas throughflow apertures and forms a boundary wall for the suspension, the gas throughflow apertures — as viewed in plan view — being arranged at least over a portion of the base area.

A particularly steady flow for the suspension through the container is obtained if the gas distributor is arranged in the lower portion of the container, and the wall provided with gas throughflow apertures is situated in the bottom of the container and forms at least a part of the bottom, the wall being preferably a screen plate and inserted in the bottom. According to a further feature, the container comprises an inlet duct at one side, e.g., in the case of a rectangular prismatic container at one broad side wall, and an outlet duct at the opposite side, in the example mentioned at the other broad side wall, which ducts are parallel to the walls, the inlet duct communicating with the container through an inlet aperture in its lower portion and the container also communicating with the outlet duct through an outlet aperture at the surface of the suspension, and that the inlet and outlet apertures are rectangular and extend horizontally over the entire width of the container where they are provided.

A particularly space-saving flotation device is obtained if the gas distributor is arranged within a defined area which is bounded in the horizontal direction by the planes delimiting the vertical walls of the container.

A particularly space-saving installation is obtained by stacking on one another a plurality of flotation device connected in series as regards the direction of flow of the suspension, the outlet duct of the upper flotation device in each case opening into the inlet duct of the flotation device situated below.

BRIEF DESCRIPTION OF THE DRAWING

One constructional example of the invention will be explained in detail hereinafter with the help of the drawing, in which:

FIG. 1 is a vertical longitudinal section of a part of a tower composed of the flotation device units according to the invention.

FIG. 2 is a partial plan view of the bottom wall of the upper container of FIG. 1 showing, in a diagrammatic way, the arrangement of the gas throughflow apertures.

DESCRIPTION OF THE PREFERRED EMBODIMENT

The individual device comprises a container 1 for the suspension, which flows through an inlet aperture 2 into the container 1 and issues from the container 1 through an outlet aperture 3. To subject the suspension in the container 1 to gas treatment, a stationary wall 4 of a gas distributor 5 is arranged in the lower portion of the container 1. The wall 4 is provided with gas throughflow apertures 6 which — as viewed in plan view — extend over at least the part of the base area of the container 1. The gas distributor 5 is arranged below on the container 1 and its stationary wall 4, provided with the gas throughflow apertures 6, is in the bottom 7 of the container 1. The wall 4 forms a part of the bottom 7 and is a screening or sieve plate which is fixed in the bottom 7 by means of the strips 8.

The container 1 is in the form of a rectangular prism and — as viewed in plan view — is longer than it is wide (this is not shown in the drawing). An inlet duct 10 for introducing the suspension is arranged at a broad side wall 9 (that is to say one of the walls of the container 1 which extend over the width of the container 1) and an outlet duct 12 for discharging the suspension is arranged at the other broad side wall 11. The inlet aperture 2 which connects the inlet duct 10 to the container 1 is situated in the lower portion of the container 1. The outlet aperture 3 which connects the container 1 to the outlet duct 12, is situated at the surface 13 of the suspension. The ducts 10 and 12 extend parallel to the broad side walls 9 and 11 and over the entire width of the container 1.

The inlet aperture 2 and the outlet aperture 3 are rectangular and extend over the entire width of the container 1. The outlet aperature 3 is provided with an adjustable-height lower edge 14. The spacing between the bottom 7 and the lower edge 14 is less than the width of the container 1. The inlet aperture $2^1$ in the lower container $1^1$ is provided with an adjustable edge $14^1$.

The gas throughflow apertures 6 in the screening plate or in the wall 4 begin along the inlet aperture 2 and directly in the vicinity of the inlet aperture 2. As indicated in FIG. 2, the gas throughflow apertures become smaller in size and there are fewer of them as the distance from the inlet aperture 2 in the direction towards the outlet aperture 3 increases. Thus the intensity of gas treatment decreases in the indicated direction.

The surface 13 of the suspension is interrupted over the width of the container 1 by means of a weir 15. At the overflow side of the weir 15 a channel 16 is arranged over the entire length of the said weir 15. It is intended to collect and discharge the foam forming above the surface 13 as a result of the gas treatment. The wall 17 of the channel 16 which is remote from the weir 15 projects above the surface 13 of the suspension and separates the outflowing suspension from the foam. The upper portion of the suspension region is subdivided over the width of the container 1 by means of a baffle wall 18, the baffle wall 18 extending down into the suspension and in front of the outlet aperture 3, forming a siphone barrier. The weir 15 and the channel 16 form the upper portion of the baffle wall 18.

The channel 16 may also be made deeper than illustrated here, in which case the baffle wall 18 can be dispensed with.

A driven conveying device 19 is arranged above the surface 13 of the suspension for accelerating the discharge of the foam to the channel 16 over the weir 15. This conveying device in the upper flotation device is constructed as a paddle wheel and in the second flotation device situated lower down, by way of example as another embodiment of the conveying device, as a paddle belt 20. The conveying devices 19 and 20 extend over the entire width of the container 1.

The region of the gas throughflow apertures 6 in the screening plate and in the wall 4 terminates short of a plane defined by the baffle wall 18 in the direction of flow of the suspension. (At the throughflow aperture $6^1$).

The gas distributor 5 is arranged at the underside of the container 1 within a space defined in the horizontal direction by the theoretical planes of the vertical walls of the container 1. These are the vertical broad side walls 9 and 11 and the two vertical longitudinal walls of the container 1, of which only the rear wall 21 is visible.

Air is used for the gas treatment mentioned. For this purpose air is introduced into the gas distributor 5 from a central compressed air conduit (not shown) via a preceding reducing valve through the pipe 26. For eventual emptying, e.g., for cleaning the apparatus, outlet connections 27 and 28 are arranged at the lowest points of the container 1 and gas distributor 5 respectively. Other gases may also be used for the gas treatment instead of air.

A plurality of flotation devices are put together to form a flotation tower, connected on one another and-/or carried by means of simple connecting elements 22 and 23. Only a part of such a tower is shown in the drawing. The flotation devices are connected in series with one another as regards the direction of flow of the suspension. The outlet duct 12 of the upper device opens into the outlet duct 24 of the device situated below. The construction of the tower is very simple and space-saving and only a single pump 25 is required for conveying the suspension. The suspension flows into the next stage of the flotation process simply because of its height.

The constructional example described does not in any way limit the further constructional possibilities of the invention. The simple construction with smooth metal walls makes it possible to construct the flotation apparatus in other geometric forms also, and the dimensions may also be different from those illustrated.

It is thus possible to adapt the flotation apparatus substantially to the given circumstances of the throughput volume available for purification and the space available.

Thus the container 1 can also be given a circular plan, amongst other shapes. The container may also be deeper and the depth of the suspension may be greater than illustrated. It is possible as regards the plan view of the bottom 4 to make the length shorter than the width of the bottom. To obtain a predetermined throughput volume, the length of the weir 15 is of decisive importance. The intensity of the gas treatment or the distribution thereof in the container can be adapted within wide limits to a desired throughput volume. For this purpose the construction of the gas throughput apertures 6 and/or the gas pressure in the gas distributor or the gas quantity introduced there can be suitably adapted in particular.

When the flotation apparatus is to stop operating, the suspension remaining in it which has not yet been deinked is not lost. The remaining suspension is subjected to gas treatment until the deinked suspension is discharged through the outlet cocks 27.

The open construction of the flotation apparatus permits easy access for observing the flotation operation, for possible adjustment of the process conditions or for cleaning purposes.

We claim:

1. A flotation device for purifying a suspension of fibrous material and especially for deinking a paper stock suspension, the device comprising a container for said suspension; suspension inlet and outlet apertures at opposite sides of the container and connected, respectively, with inlet and outlet ducts; means for the gas treatment of said suspension inlcuding a gas distributor arranged in the lower portion of the container and having a stationary wall which is provided with gas throughflow apertures and forms a boundary wall for said suspension, the gas throughflow apertures, in plan view, being arranged at least over a portion of the base area of the container and being so sized and distributed that the intensity of the gas treatment effected decreases in the direction from the inlet to the outlet side of the container; and means for discharging from the surface of the suspension foam produced by the gas treatment.

2. A device according to claim 1, wherein said gas distributor is arranged at the underside of said container, said wall provided with gas throughflow apertures is situated in the bottom of said container and forms at least a part of said bottom, and said wall is a screening plate and is inserted in said bottom.

3. A device according to claim 1 wherein said container has a rectangular prismatic shape; and ducts extend parallel to opposite side walls of the container; said inlet aperture is in the lower portion of the container; and said outlet aperture is at the surface of said suspension.

4. A device according to claim 3, wherein said inlet and outlet apertures are rectangular and where they are arranged they extend horizontally over the entire width of said container at that region.

5. A device according to claim 3, wherein said surface of said suspension is interrupted over the width of the path of said suspension through said container by means of a weir, and at the overflow side of said weir there is arranged along the said weir a channel for collecting and removing said foam, a wall of said channel remote from said weir projecting above said surface of said suspension.

6. A device according to claim 5, wherein above said surface of said suspension a driven conveying device for accelerating the discharge of said foam to said channel is arranged upstream of said weir in the direction of flow of said suspension.

7. A device according to claim 3, wherein the upper portion of the suspension region is sub-divided over the width of the path of said suspension through said container by means of a baffle wall, said baffle wall extending into said suspension and being situated upstream of said outlet aperture.

8. A device according to claim 7, wherein said weir with said channel forms the upper portion of said baffle wall.

9. A device according to claim 7, wherein the region of the gas throughflow apertures in said wall terminates, considered in the direction of flow of said suspension, upstream of the plane defined by said baffle wall.

10. A device according to claim 3, wherein said gas distributor is arranged within a defined area which is bounded in the horizontal direction by the theoretical planes of the vertical walls of said container.

11. A device according to claim 1 in which the size of the gas throughflow apertures decreases gradually in the direction from the inlet to the outlet side of the container.

12. A device according to claim 1 in which the number of gas throughflow apertures decreases gradually in the direction from the inlet to the outlet side of the container.

13. A device according to claim 1 in which both the size and the number of gas throughflow apertures decreases gradually from the inlet to the outlet side of the container.

* * * * *